United States Patent [19]

West

[11] 4,178,943
[45] Dec. 18, 1979

[54] ROTOR FOR AN AXIAL FLOW ROTARY SEPARATOR

[75] Inventor: Neil L. West, Bettendorf, Iowa
[73] Assignee: Deere & Company, Moline, Ill.
[21] Appl. No.: 889,626
[22] Filed: Mar. 24, 1978
[51] Int. Cl.² ............................................. A01F 12/18
[52] U.S. Cl. ..................................... 130/27 T; 56/14.6
[58] Field of Search ............ 56/14.9; 130/27 R, 27 T, 130/27 P, 27 Q, 27 HA

[56] References Cited

U.S. PATENT DOCUMENTS

| | | | |
|---|---|---|---|
| 855,461 | 6/1907 | Laczay et al. | 130/27 HA |
| 2,266,806 | 12/1941 | Ronning | 130/27 HA |
| 3,256,887 | 6/1966 | Ausherman | 130/27 R |
| 3,410,271 | 11/1968 | Hengen et al. | 130/27 R |
| 3,481,344 | 12/1969 | Stokland | 130/27 R |
| 3,512,533 | 5/1970 | Loewen | 130/27 R |
| 3,664,100 | 5/1972 | Rowland-Hill | 130/27 T |
| 3,669,121 | 6/1972 | Rowland-Hill | 130/27 T |
| 3,982,549 | 9/1976 | De Paun et al. | 130/27 HA |

Primary Examiner—Russell R. Kinsey

[57] ABSTRACT

Material control elements carried by the rotor of an axial flow rotary combine separator include inclined blades as well as conventional rasp bars. The inclined blades take various forms but common features include their downstream inclination, (that is in the direction of the axial movement of crop material in the separator) and having a frontal working edge athwart the direction of rotation to engage crop material and deflect or urge it downstream. The orientation and configuration of the blades results in their working edges being their dominating material control feature while the inclined surfaces have a subordinate role in material control, the actual effect of the surfaces depending on the orientation of their line of slope with respect to the rotor axis.

33 Claims, 13 Drawing Figures

ROTOR FOR AN AXIAL FLOW ROTARY SEPARATOR

BACKGROUND OF THE INVENTION

This invention relates to axial flow rotary separators for agricultural crops of a kind typically embodied in combines and more particularly to material control and conveying elements carried on the rotors of such separators.

The mode of operation of such separators is well known. Crop material is fed into the annular space between a rotor and a stationary housing, which includes grate portions, and through cooperation between rotor and housing the material is propelled in a spiral path through the annular space while grain is threshed and separated from it and expelled through the grates and collected for further processing. Typically the rotor includes a first, upstream feed rotor portion designed to receive crop material from a feeder house and convey it into the separator proper.

The internal surface of the housing and the external surface of the rotor are provided with material control elements or features so that the relative motion between the rotor and housing surfaces effects the processing and conveying of the material contained between them. The material control elements used in existing separators vary in detail but, typically, axial indexing is effected by generally helical ribs (either continuous or interrupted) carried usually by the housing but sometimes by the rotor or by both. The rotor typically carries generally axially extending elements which have primarily a processing function and only secondarily a conveying function and may include conventional rasp bars in the threshing section and paddles in a separating section. The general form of these elements, particularly those on the rotor, is radially extending with respect to the axis of the rotor. These relatively simple and conventional forms of material control elements can be combined fairly readily to produce axial flow rotary separator designs which perform well in a limited range of crops or crop conditions, for example handling corn and soybeans at moderate moisture contents. However, there is a tendency with conventional material control elements and particularly those of generally radial extent for crop material to collect into "ropes" or fold into wads in advance of the elements, tending to jam or wedge between the rotor and housing and causing serious fluctuations in torque in the rotor drive system (if not actually plugging the machine) and reducing threshing and separating efficiency because of the undesirable bunching of material. The tendency for these conventional material control elements to actually lose control of material is especially pronounced in handling the more difficult crop materials, particularly long straw varieties at high moisture contents and especially rice.

A particular problem in axial flow rotary separators is to transform, in as short an axial space as possible, a concentrated stream of crop material delivered by a feeder house into a thin annular mat for efficient reception into the relatively confined annular space of the threshing zone. It is known to provide a stepped grate or concave to permit increased grate or concave clearance at the beginning of the threshing section and also to provide specially designed feed rotor flights in attempts to overcome this problem.

Combines embodying axial flow rotary separators potentially have high specific capacity and versatility but with the material control elements and systems so far known, these potentials have been only partially realized.

SUMMARY OF THE INVENTION

Accordingly, it is an object of the present invention to provide an axial flow rotary separator less sensitive to crop material condition and type and one in which material flow is uniform, positive and consistent. More particularly, it is an object to provide material control elements for the rotor of such a separator that improve threshing and separating efficiency by providing good material handling and maintenance of material control as crop material progresses through the machine.

It is an important feature of the invention to use as a rotor functional element a blade with a frontal (with respect to rotor rotation) working edge for primary engagement of crop material as the rotor rotates and so inclined that the blade surfaces play only a selective subordinate role in conveying and controlling the crop material. This concept results in less friction between the rotor elements and the crop material and lower specific power consumption and is particularly effective when harvesting crops at high moisture content.

Another feature of a material control element according to the invention is that its net effect results from the combination of the separate and characteristic effects of the working edge and frontal or leading blade surfaces, respectively. While the working edge must be generally athwart the direction of rotation and oriented so as to have a conveying effect in the desired axial direction, the line of maximum slope or inclination of the blade leading surface, while it must always have a downstream component, that is, a component in the axial direction of flow of material, may, according to the spirit of the invention, be oriented anywhere in a broad zone from almost in the direction of rotation to almost opposite that direction although perferably within an approximate quadrant extending from approximately 45° in the direction of rotation to approximately 45° against the direction of rotation. The direction in which kernels of grain colliding with a blade surface will be deflected depends on this orientation, such collisions tending generally either to accelerate or to retard the axial progress of the grain through the separator and to accelerate it either radially inwardly or outwardly and potentially affecting threshing and separating efficiency. This feature of the material control element of the invention may be used selectively in design to optimize the several functions of the material control element according to the portion of the separator in which it is located, or the variety of crop to be handled, or other needs.

Another advantage of the invention is that it allows selective use to be made of the tendency of a leading edge or surface having a backwards slope with respect to the direction of rotor rotation to force material outwards against the concave with a potential for increased separation efficiency.

Another advantage of the invention is that the working edge has a combing action in the crop material which helps in separation and maintaining a uniform and attenuated mat of material, a relatively high population of such elements on a rotor tending to maintain a thinner mat of crop material.

Another feature of the invention is that the downstream inclination of the blade creates a pocket beneath and behind the working edge, providing relief space to avoid compression and bunching of material and permit desirable slippage and tumbling to take place.

When an element according to the invention presents predominately a working edge rather than surface to engage the crop material, the relatively low friction of the edge results in relatively high but controlled slippage between the rotor and crop material, which is to say that the relatively slower speed of the crop material around the periphery of the housing or grate is approximately a constant proportion of the peripheral speed of the rotor.

It is another feature of the invention that it is adaptable to be used in various portions of the separator including the feed rotor portion of a transition portion from the feed to the threshing section as well as in the threshing and separating sections themselves. In a transition portion, blades according to the invention may be used in an array spanning the rotor transition portion in combination with a ramp-style rasp bar, an element in which both clearance between the "rasps" (or blades) themselves and between rasps and housing progressively decrease between the upstream and downstream ends of the bars. Material control elements according to the invention may also be used in combination with a variety of other rotor elements such as conventional rasp type threshing bars, with radially extending separating bars or as a threshing element in conjunction with a spike-tooth concave.

DESCRIPTION OF THE PREFERRED EMBODIMENT

Figure 1:
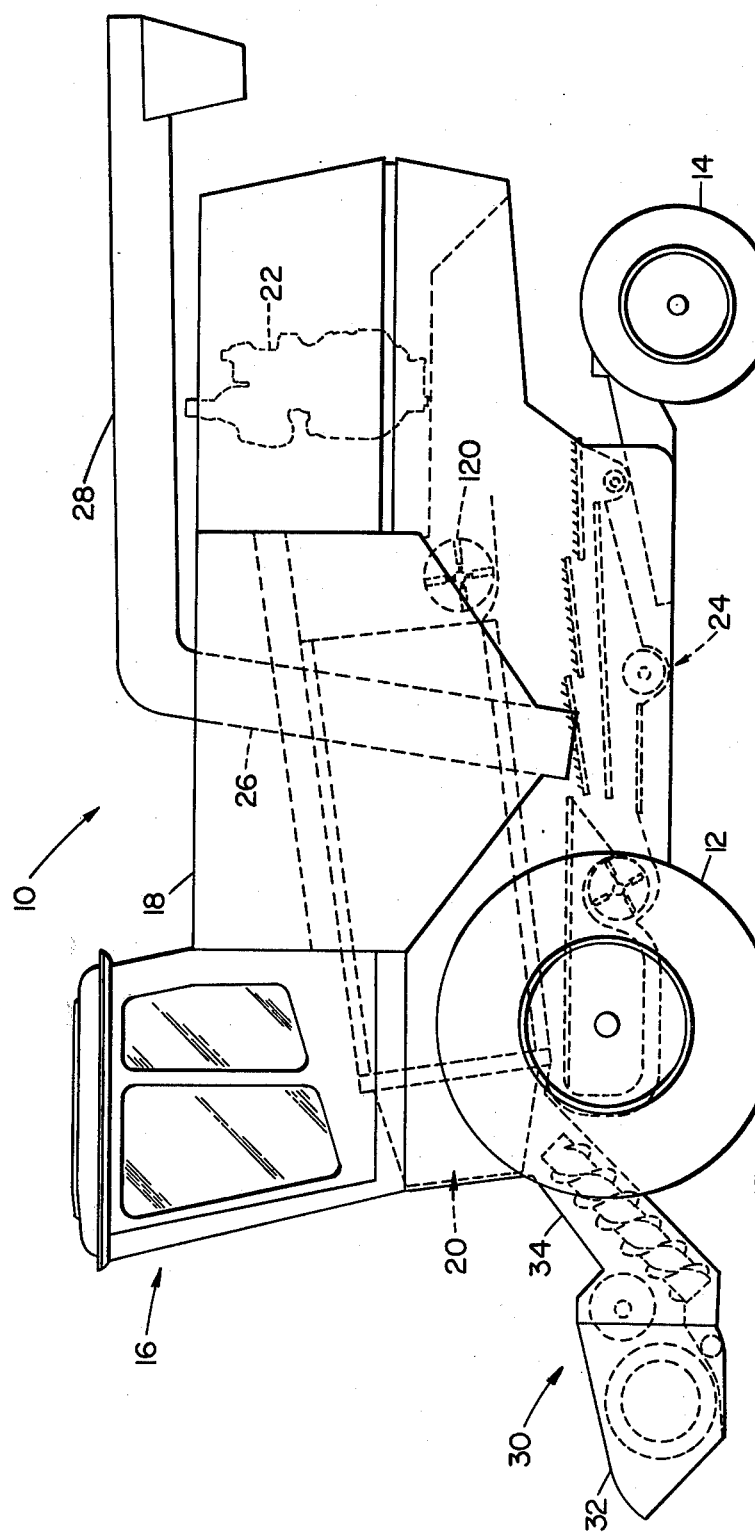
FIG. 1 is a side elevation of a combine embodying the invention.

The invention is embodied in a self-propelled combine having a main separator body indicated generally by the numeral 10 and supported by a pair of laterally spaced forward drive wheels 12 and steerable rear wheels 14. An elevated operator's station 16 is mounted forward on the body immediately ahead of a grain tank 18. The central forward portion of the combine body 10 is occupied by a fore-and-aft extending axial-flow rotary separator or crop processing unit 20 and a rear mounted engine 22 provides power for propelling the combine and driving its components. A generally fore-and-aft extending cleaning shoe 24 is carried beneath the separator 20. A grain unloading system includes a vertical auger conveyor 26 and a swingable unloading auger conveyor 28.

Mounted immediately ahead of the separator 20 is a header 30 including a gathering unit 32 such as a conventional grain platform, and shown in FIG. 1 only, for gathering a crop as the combine advances over a field and delivering crop material to an auger feeder house 34 which in turn delivers it rearwardly and upwardly to the rotary separator 20. A feeder house of a type suitable for feeding a rotary separator is described fully in copending application Ser. No. 736,440 also assigned to the assignee of the present application. Apart from the rotary separator and feeder house, other components of the combine are generally conventional and are not described in detail here.

Figure 2:
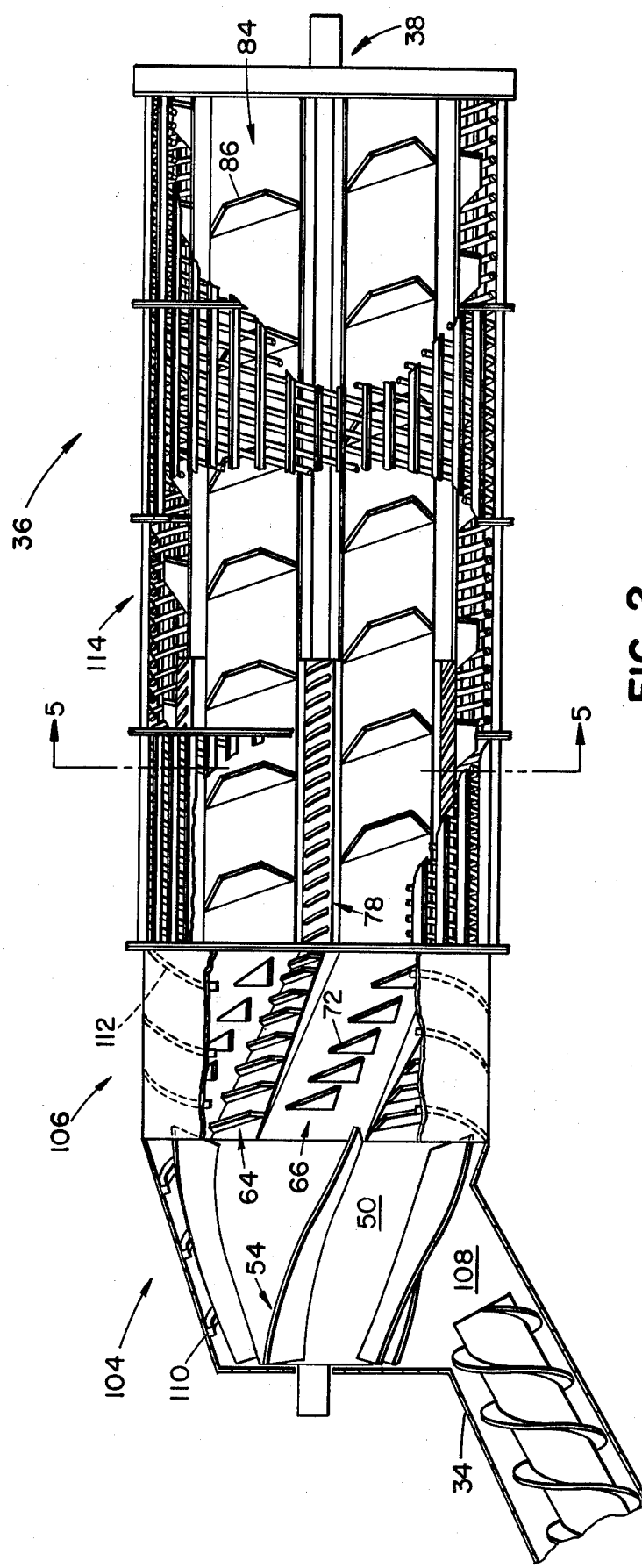
FIG. 2 is an enlarged, partially cut away side elevation of the separator and feeder house of the combine shown in FIG. 1.

The rotary separator 20 is shown in some detail in FIG. 2 and includes a fixed fore-and-aft extending housing 36 surrounding and concentric with a rotor 38. The periphery of the rotor 38 is spaced from the inside of the housing 36 so that there is an annular space 39 (seen best in FIG. 5) extending the length of the separator. The rotor 38 (as seen best in FIG. 3) includes a forward frusto-conical infeed portion 40 and a generally cylindrical main portion including, from front to rear, transition 42, threshing 44, and separating 46 portions. The body or frame of the rotor 38 includes a forward frusto-conical infeed portion 50 and a main cylindrical portion 52 and is supported for rotation in the combine frame and driven by conventional means (not shown).

The rotor infeed portion 40 carries a set of six circumferentially equally spaced generally helical flights 54 rigidly attached to the infeed rotor body 50 by their inner edges 56. Each blade 54 has an outer edge 58 and has a somewhat twisted form so that its leading edge 60 and trailing edge 62 are inclined into and away from the direction of rotation, respectively.

The transition portion 42 of the rotor occupies the forward part of the cylindrical body 52 and is contiguous with the infeed portion 40 and includes six circumferentially equally spaced sets of material control elements, each set including a ramp-style rasp bar 64 and an elongated array of tilt blades such as the row 66 shown here. In each set both the ramp-style rasp bar 64 and the row of tilt blades 66 are disposed helical fashion on the rotor body 52, each with their forward ends adjacent the rearward end of an infeed rotor blade 54, but diverging rearwardly so that at the rear of the transition portion 42 the row of tilt blades 66 of one set converges on the downstream end of the ramp-style rasp bar 64 of the adjacent set.

Figure 4:
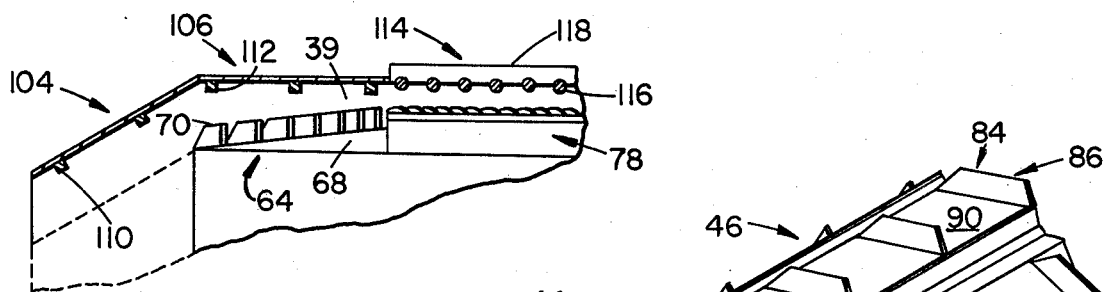
FIG. 4 is a semi-schematic partial side view showing the ramp-style rasp bar included in the separator transition portion.
Figure 3:
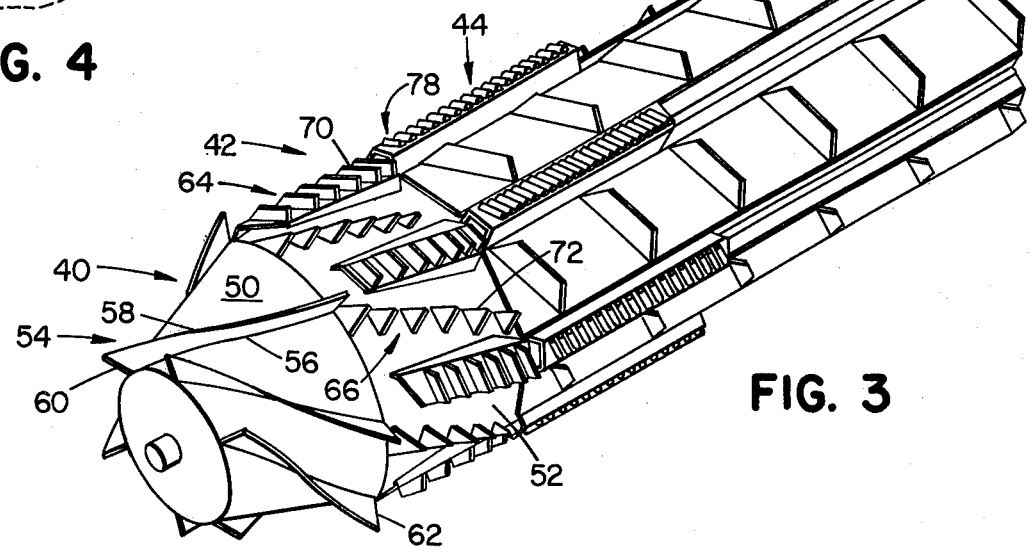
FIG. 3 is a front left, three-quarter perspective view of the rotor of the separator shown in FIG. 2.

Each ramp-style rasp bar 64 includes a ramp-like base 68 increasing in height from front to rear and seen best in FIGS. 3 and 4 and, mounted rigidly on the base 68, a series of ramp blades 70, each blade extending approximately radially and, in relation to the rotor body cylindrical portion 52 being angled or helically disposed and mounted so that the spacing between adjacent blades decreases from front to rear.

Each row 66 of tilt blades includes a series of generally triangular tilt blades 72, to be described in detail below.

Figure 5:
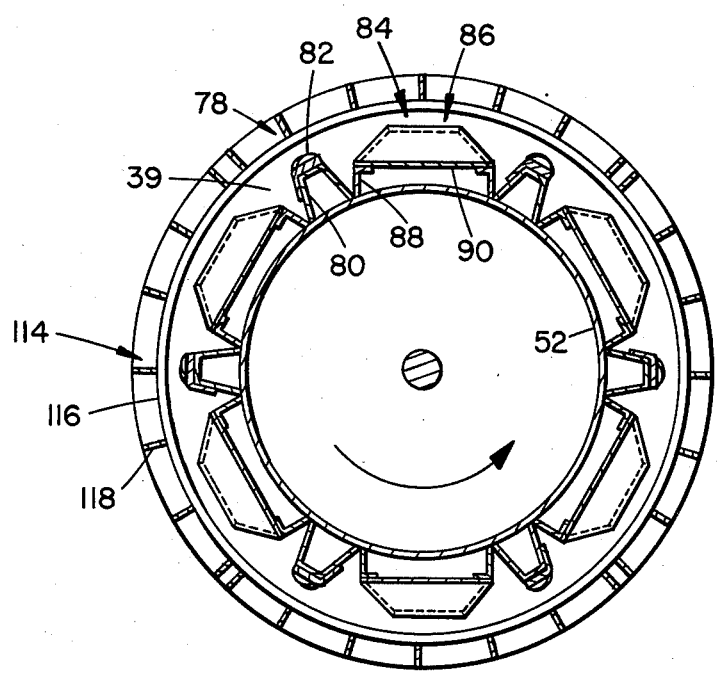
FIG. 5 is a semi-schematic cross sectional view of the threshing section of the separator on line 5—5 of FIG. 2.

The threshing portion 44 of the rotor includes six equally circumferentially spaced axially extending conventional rasp bars 78, each rasp bar being carried and spaced from the rotor body 52 by a generally axially extending threshing bar support 80, seen best in FIG. 5, and including, as is conventional, a plurality of generally radially extending ribs 82.

Extending axially from the forward end of the threshing portion 44 to the rearward end of the separating portion 46 of the rotor and, in the threshing portion 44, lying between adjacent threshing bars 78, are six circumferentially equally spaced separating bars 84. Each separating bar includes a plurality of canted blades 86 (described in detail below), mounted on a carrier 88 (seen best in FIG. 5), which is rigidly attached to the cylindrical rotor body 52, and includes an outer surface 90, tangential to the rotor and forming a floor for the array of blades 86.

The rotor housing 36 includes solid or imperforate forward frusto-conical infeed and cylindrical transition portions 104 and 106, respectively. The infeed portion 104 includes a downwardly and forwardly directed opening 108 for receiving crop material from the feeder house 34. Pluralities of fixed lead members such as the raised helical ribs 110 and 112 shown are carried by the inner surfaces of the infeed and transition housing portions 104 and 106, respectively.

The threshing and separating sections of the rotor, 44 and 46 respectively, are surrounded by a spiral rod grate 114 comprising a plurality of spirally disposed rods 116 supported by a plurality of circumferentially spaced axially extending spacer bars 118.

Surrounding the grate 114 are suitable collecting and diverting means (not shown in the drawings) for intercepting grain and chaff expelled through the grate and diverting it downwards to the cleaner 24.

A transversely mounted rotating beater 120 (shown only in FIG. 1) is disposed immediately adjacent and below the discharge or downstream end of the separator 20 for propelling straw generally rearwardly and onto the ground behind the combine.

Figure 13:
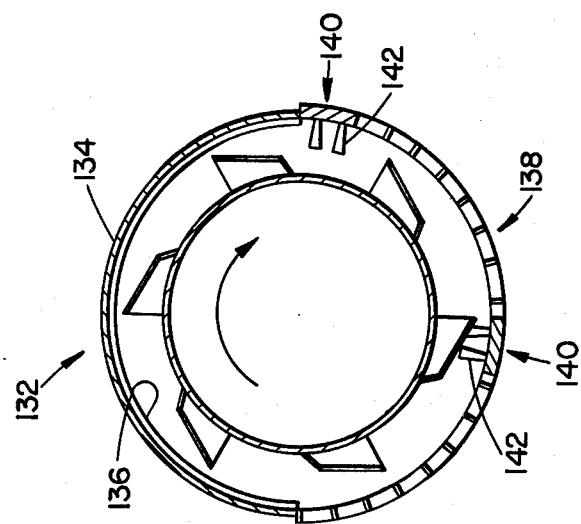
FIG. 13 is a cross sectional view taken on line 13—13 of FIG. 12.
Figure 12:
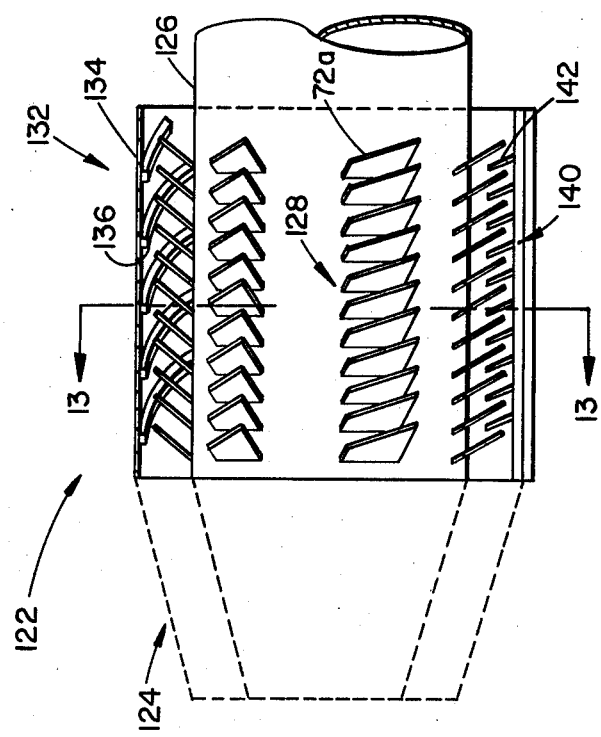
FIG. 12 is a semi-schematic cut away side view of a separator threshing section including an alternate embodiment of the invention.

An alternative threshing section 122, also embodying the invention and particularly suitable for use in harvesting rice, is shown in FIGS. 12 and 13. Material flows axially into the threshing section 122 from an infeed section 124, shown in phantom outline only in FIG. 12. The threshing rotor includes a cylindrical body 126 which carries six circumferentially equally spaced axially extending arrays 128 of tilt blades 72a. These blades, to be described in detail below, are each similar in form and orientation with respect to the rotor axis to the blades 72 shown in FIGS. 2 and 3 and are fixed to the rotor body 126 with all blades inclined equally downstream.

A threshing housing 132 surrounds the rotor threshing portion and includes an upper solid or imperforate cover 134 carrying a plurality of fixed raised helical lead members 136 and a lower foraminous concave or grate portion 138. Rigidly attached to the grate 138 are two circumferentially spaced rows 140 of spike teeth, of the type used in conventional spike-tooth combine threshing cylinders. Each row 140 comprises a staggered array of teeth, each tooth 142 being inclined upstream at an angle approximately equal to the downstream inclination of the tilt blades 72a. The teeth are disposed so that they overlap radially and as the rotor rotates each tilt blade 72a passes either approximately centrally (in terms of axial spacing) between adjacent teeth 142, or, in the case of the endmost blades, adjacent a spike tooth.

Figure 8:
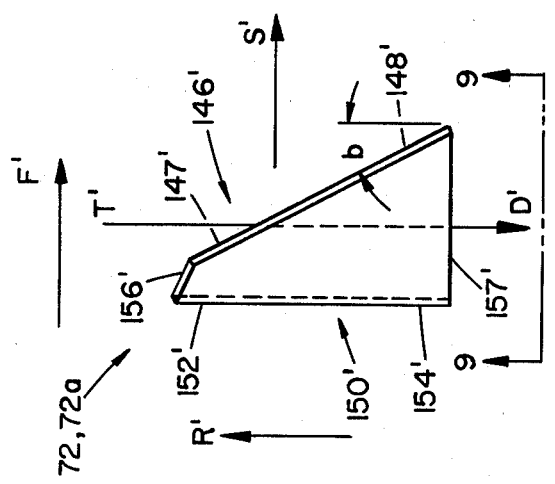
FIG. 8 is an enlarged view of a tilt blade (removed from the rotor and viewed in the equivalent of a radially inward direction).
Figure 9:
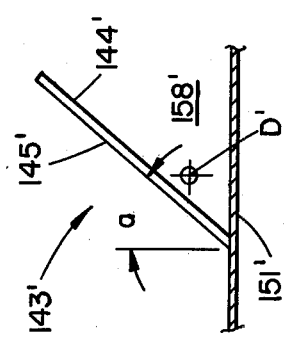
FIG. 9 is an end view of the tilt blade taken on line 9—9 of FIG. 8.
Figure 6:
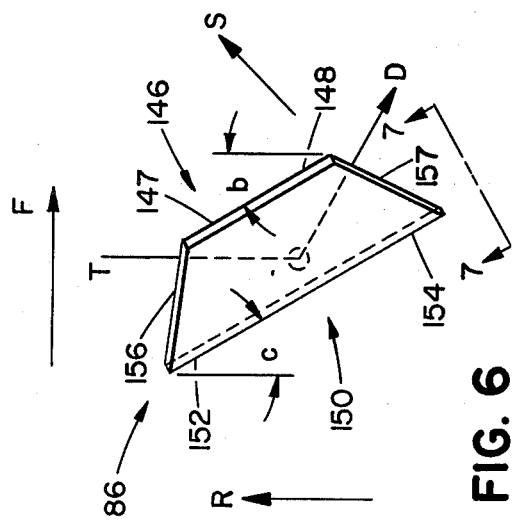
FIG. 6 is an enlarged view of a canted angle blade (removed from the rotor and viewed in the equivalent of a radially inward direction).
Figure 7:
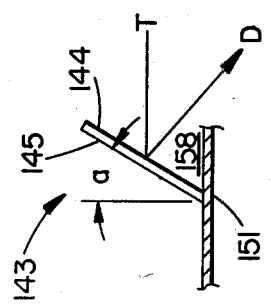
FIG. 7 is an end view of the canted blade taken on line 7—7 of FIG. 6.

The tilt blade 72 and canted blades 86 shown on the rotor in FIGS. 2 and 3 and the tilt blade 72a in the alternative embodiment shown in FIGS. 12 and 13 are all particular embodiments of the inclined material control and conveying blade of the invention and are shown in more detail and generalized form in FIGS. 6 and 7 (canted blade) and 8 and 9 (tilt blade) respectively. Features characteristic of the inclined blade of the invention and shared by the canted (86) and tilt blades (72 and 72a) include having a relatively slender body (143 and 143') with approximately parallel inner and outer surfaces (144, 144' and 145, 145' respectively) and being inclined in a generally downstream direction (F, F') with an angle of inclination of the body away from the radial of a and a' respectively as shown in FIGS. 7 and 9. It is convenient to express the orientation of the inclination of the blade in terms of the direction of its "line of slope (S, S')", that is to say, the direction of the line of maximum slope of the body surfaces. Such direction is given by the projection of that line in the inclined surface which is perpendicular to the line of intersection of the plane of the inclined surface with a plane parallel to one tangential to the generally cylindrical periphery of the rotor and passing through the blade surface, into the latter plane. Thus, a canted blade (FIG. 6) is, broadly speaking, defined as a blade whose line of slope (S) lies in the quadrant bounded by an axially downstream direction (F) and the circumferential direction of rotation (R), but preferably in the range bounded by an axially downstream direction and one 45° towards the direction of rotation. A tilt blade (FIG. 8) is one in which the line of slope (S') lies axially downstream.

The blades are shaped so as to present a working edge (146 and 146') to crop material as the rotor rotates, the edge having, with respect to the direction of rotor rotation (R, R'), leading and trailing portions (147, 147' and 148, 148' respectively). In keeping with the invention, the working edges (146, 146') are oriented so that they have a positive lead angle, that is, the leading portions (147, 147') are upstream of the trailing portions (148, 148'), the angle of departure of the working edge from a plane normal to the rotor axis being indicated in FIGS. 6 and 8 by the letters b and b' respectively. The canted blade 86 of this embodiment has a working edge (146) perpendicular to its line of slope (S), but it will be appreciated that with a line of slope so oriented, a desired positive working edge lead angle (b) may be obtained with other alignments of working edge in relation to said line of slope, but, of course, within the limits predetermined by the particular line of slope of the canted blade. In the case of the tilt blade (72, 72a), however, positive working edge lead angle (b') can be obtained only with an edge (146') oblique to the line of slope (S') so that it slopes backwards (with respect to rotor rotation) and outwards.

Each inclined blade also includes a base edge (150, 150') by which, as in the embodiments shown in FIGS.

6–9, it may be mounted on a rotor frame or blade carrier surface (151, 151'), the base edge having leading and trailing portions (152, 152' and 154, 154' respectively). The base edge (150, 150') also has a lead angle, that angle between the edge and a plane normal to the axis of the rotor, indicated by the letter c for the canted blade 86 in FIG. 6. In the special case of the tilt blade (72 or 72a), shown in FIG. 8, the corresponding angle c' (not indicated in FIG. 8) is zero. It should be noted that to simplify the description of the essentials of the blades, they have been shown in FIGS. 6–9 as mounted on a floor-like surface (151, 151') tangential, as it were, to the generally cylindrical periphery of a rotor. The base edges (150, 150') will thus, following our above definition, be perpendicular to their respective lines of slope (S, S'). More generally, of course, the lead angle of the base or inner edge (150, 150') is a function of the angle of inclination of the blade (a, a') and the (oblique) angle which the edge makes with the line of maximum slope of the blade. Another aspect of the versatility of the blades of the invention is, therefore, that given a particular blade inclination (a, a') and line of slope (S, S'), base edge (150, 150') alignment and/or floor or mounting surface aspect (with respect to a plane tangential to the general cylindricality of the rotor periphery) may be chosen to achieve a particular desired base edge lead angle (c, c') to suit a particular application.

Each blade also has a shin edge (156, 156') extending between the leading portions (152, 152' and 147, 147') of the base (150, 150') and working (146, 146') edges respectively and preferably is backward sloping relative to the direction of rotation. Each blade also has a trailing edge (157, 157') extending between the trailing portions (154, 154' and 148, 148') of the base and working edges (150, 150' and 146, 146') respectively. However, it will be understood that the shin (156, 156') and trailing (157, 157') edges as such are not essential features of the blade of the invention. They may, in effect, be coextensive with the leading and trailing portions of the working edge as, for example, in a blade in which the edges are entirely defined by a base edge and a continuously curving working edge (not shown in the drawings) extending between the opposite extremities of the base edge.

In operation, as is well known, a self-propelled combine such as the embodiment of the present invention advances over a field of crop material which is gathered by the gathering unit 32 and conveyed by way of the feeder house 34 to be engaged by the infeed rotor portion 40, from whence it is conveyed spirally and rearwardly through the separator in the annular space 39 between the rotor 38 and the housing 36 as the result of the interaction between the crop material and the stationary lead members inside the housing such as the helical members 110 and 112 and the material control and conveying members of the rotor such as the tilt blades 72 and the canted blades 86.

The threshing of grain from the ears is effected principally by rubbing action between the rasp bars 78 and the grate 114 and separation and expulsion of grain and chaff through the grate to be collected and delivered to the cleaner 24 continues as the crop material is conveyed spirally rearwards. Straw is ejected rearwardly from the rear of the housing 36 and, with the assistance of the beater 120, is discharged rearwardly onto the ground. Clean grain from the cleaner 24 is delivered to the grain tank 18 by conventional conveying means (not shown).

Considering now the particular operational characteristics of the inclined blade of the invention, the canted (86) and tilt (72, 72a) blades shown in detail in FIGS. 6, 7, 8 and 9 are referred to as exemplary embodiments. The dominating material conveying and control feature is the working edge (146, 146') while the inner and outer surfaces of the blade (144, 144' and 145, 145' respectively) play a relatively subordinate role, the importance of which varies according to the orientation of the line of slope (S, S') and the downstream inclination of the blades (a and a'). As the rotor rotates, crop material is engaged primarily by the working edge (146, 146'). The downstream inclination of the blade creates a pocket or relief space (158, 158'), behind and radially inside of the working edge, concentrating contact between crop material and the blade on the relatively small area of the working edge. Preferably the working edge is without discontinuities so that friction between it and the crop material is low contributing to slippage between the crop material and the rotor and so that the blades, while maintaining control and continuing to advance the material in the axial direction indicated by the arrows (F, F'), (due to the lead angle b, b'), do so with less "stress" and power requirement than conventional material movers such as radially extending continuous helical members or near axial radially extending paddles. Note, that while the working edge (146) of the canted blade (86) is approximately tangential to the rotor that (146') of the tilt blade (72, 72a) slopes backwardly and outwardly enhancing the combing effect of the inclined blade and its tendency to attenuate the mat of crop material. The use of an array of inclined blades minimizes the creation of compressed bunches of material and the "pocket" formed under and behind the working edge allows slippage of material without further compressing the mat of material.

The working edge (146, 146') presents a relatively small impact area for loose grain and so it is the greater bulk of the crop material, material other than grain (MOG) which is conveyed and controlled directly by the working edge. In general it may be said that during the separation process threshed grain is largely conveyed through being carried by the MOG rather than directly by the blades. However, grain kernels threshed from the ears have at least the opportunity of encountering the relatively larger areas of the blade surfaces (particularly the inner surfaces 144, 144') and while the working edge of the blade of the invention is always oriented to function in generally the same way, to convey and comb the crop material, variations in the orientation of the line of slope (S, S') and angle of inclination of the blade from the radial (a and a') have significant effects on separation according to how the blade surfaces tend to deflect any grain kernels which they encounter. For example, assuming that, relatively, the kernel of grain is approaching a blade on a tangentially circumferential path or trajectory (T, T'), in FIGS. 6 and 8 respectively, and considering first the tilt blade (72 or 72a) it can be seen that the kernal can make only tangential contact with the inner 144' blade surface, so that generally speaking a tilt blade such as illustrated here has no tendency to deflect grain axially either upstream or downstream (as indicated by D' in FIG. 8).

In the case of the canted blade 86, it can be seen from FIG. 6 that a kernel of grain approaching the blade relatively on a circumferential path T that there will be an impact on the inner or leading blade surface 144 and that the orientation of the blade surface is such that the impact will deflect the grain into a path D having both axially downstream and radially inward (towards the rotor axis) components. In itself this effect would seem to hamper separation, the deflection axially downstream tending to reduce the time the kernel remains in the separator and the radially inwards deflection carrying the kernel away from the grate through which it must be expelled to complete separation. However, the inclined blade of the invention typically is not used alone but in an array as disclosed here. Such an array is in effect an interrupted material handling and control system producing agitation, combing and reorientation of the MOG, which, coupled with the centrifugal effect of the spiral path of the MOG within the annular space between rotor and grate, produces a total separating effect which overshadows the apparently negative effect on separation of the inner surface 144 of the canted blade described above.

Compared with the tilt blade 72, 72a where the effect of blade surfaces is minimized, the canted blade 86 is a compromise. The working edge 146 still dominates bringing advantages such as ability to handle wet material without roping but the inclined inner or leading surface 144 athwart the relative direction of movement of the blade R makes significant contact with the crop material to lessen the slippage effect created by the exposed edge and provide more direct propulsion of the crop material.

Figure 10:
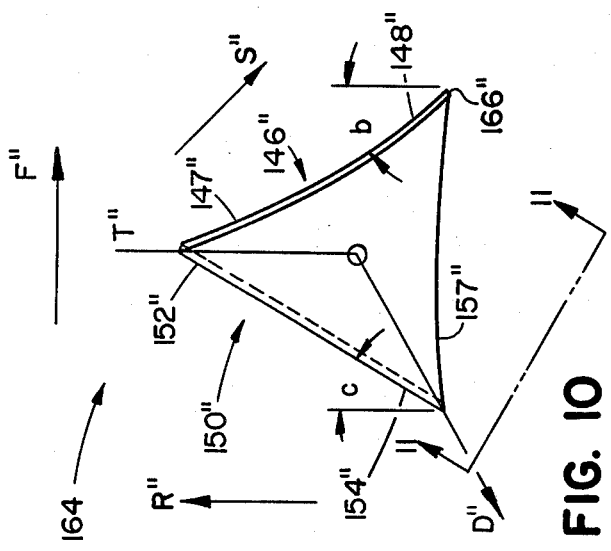
FIG. 10 is an enlarged view of a raked blade for mounting on a rotor viewed in the equivalent of a radially inward direction.
Figure 11:
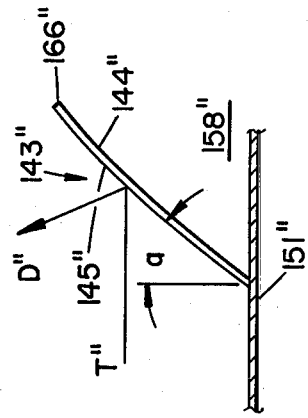
FIG. 11 is a view of the raked blade taken approximately on line 11—11 of FIG. 10.

A further embodiment of the inclined blade of the invention, suitable for use on a separator rotor, is illustrated in FIGS. 10 and 11. In this raked or compound blade 164 the inclined inner and outer surfaces 144", 145" respectively, inclined in a downstream direction, the slender body 143" and the working edge 146" oriented so as to lead or convey material downstream are retained. However, the raked blade is characterized in that its line of slope S" falls between axially downstream and counter to the direction of rotation, but preferably between the axial direction and 45° against the direction of rotation. Consequently, with a tangential mounting surface 151", the base or inner edge 150" is disposed athwart the direction of relative movement of the blade (R") with a negative lead angle and, in terms of relative motion between the blade and the crop material and grate, the blade 164 presents a backward sloping outer surface 145". (Note that in this case the outer surface 145" becomes the leading surface.) The raked blade 164 thus presents two anterior or frontal features for initial contact with the crop material, the working edge 146" and the outer surface 145". The effect of the backward and outward orientation of the outer surface 145" is to tend to increase separation efficiency through strongly supplementing the ramp effect of the similarly oriented working edge 146" forcing crop material outwards towards the grate, although an accompanying increase in friction will increase power required to drive the rotor. In this case a free kernel of grain approaching the blade relatively in a circumferential path T" will encounter the outer surface 145" of the blade and be deflected to a path D" after impact having axially upstream and radially outward components, both apparently aiding separating efficiency, the one through tending to increase the time the kernel remains in the separator and the other through sending it in the direction of expulsion through the grate. The raked blade 164 has so far been discussed as if the blade surfaces 144" and 145" were plane but they may be curved as illustrated in FIGS. 10 and 11 so that, for example, the deflecting and material control effect of the outer surface 145" will vary from one part of a surface to another. Further, the convexity of the outer surface 145" tends to "soften" the action of the blade and reduce friction by reducing the aggressiveness of the trailing blade tip 166".

It will now be clear that the inclined blades of the invention may be used on a rotor in one or more of the infeed, threshing and separating portions of a separator depending upon function objectives and such variables as type and condition of crops to be handled, proportions of the separator, etc. They may be used, for example, in axial or helical arrays circumferentially spaced around a rotor, as the only type of element on a particularly axially defined section or in conjunction with other elements such as rasp bars (threshing) or radial separator bars.

In the above embodiment, in the transition portion 42 of the rotor, the tilt blades 72 are used along with a ramp-style rasp bar 64 (discussed in more detail below). The tilt blades 72 here are of uniform height and arranged in helical formation 66 on the cylindrical rotor body 52 creating an interrupted helix conveying element effective to reduce wadding or roping compared with a continuous element offering an approximately radial blade surface. Using an array or multiplicity of relatively smaller elements such as the tilt blades here rather than a continuous member discourages collections or concentrations of material by the rotor elements resulting in a thinner more uniform mat of material and smoother operation with better separation efficiency. The tilt blades 72 in staggered formation are particularly effective here, cooperating with the ramp-style rasp bars 64 to redistribute and condition material received in a concentrated stream from the feeder house 34 and carried into the separator by the infeed rotor portion 40, into a uniform attenuated mat encircling the rotor for reception by the threshing portion 44. Tilt blades are also particularly effective in handling rice which has a strong tendency to bunch, twist and rope ahead of conventional material control elements.

It should be noted here that the tilt blade 72 illustrates another facet of the versatility of the inclined blade of the invention in that the working edge 146' is not perpendicular to the line of greatest slope of the inner and outer surfaces 144', 143'. It is oriented so that with respect to rotor form and rotation, the working edge is not tangential or circumferential but is backwardly sloped, the trailing portion 148' being disposed rearward and radially outward of the leading portion 147', tending to enhance the combing effect and also to deflect material radially outwards. In the transition portion the latter helps develop the thin mat for threshing and when used in threshing or separating portions tends to improve separation.

Compared with the tilt blades 72 the canted blades 86, carried in axial array on the separator bars 84, extending throughout the threshing and separating portions of the rotor, 44 and 46 respectively, are designed to convey rather more positively so as to move the MOG in a controlled spiral rearwardly for discharge at the downstream end of the separator. At the same time the canted blades 86 and the open space between them in each array provide sufficient slippage and agitation so that desired threshing and separating efficiency levels are achieved at acceptable power levels. In the threshing section of the separator the canted blades 86, interspersed between the rasp bars 78, contribute to threshing efficiency by a reorientation and agitation of the crop material after it leaves one rasp bar and before it is engaged by the next. Separation efficiency and material handling are interdependent and uniform and positive control of material directly aids separation.

It will be understood that just as the rows 66 of tilt blades of the transition section are disposed helically, the rasp bars 78 and separator bars 84 (FIGS. 2 and 3) and the tilt blade row 128 of the alternate embodiment threshing section (FIGS. 12 and 13) may, while still spanning their given axial extent, also be helically disposed with respect to the rotor axis. Such disposition, with an appropriate lead angle may contribute to the total effective axial displacement of crop material caused by the blade array but its most important effect is to discourage wadding or roping of material ahead of the blades which may possibly occur even with the inclined blades of the invention in some extreme conditions such as handling long, wet rice straw.

Although the present embodiment includes six each of the threshing bars 78 and separator bars 84, it is often desirable to use fewer bars, especially in rotors of smaller diameter as are typically used in a multi-rotor separator. Considerations influencing the number of bars which may be used efficiently on a given rotor include two which are related to the physical characteristics of the crop material to be handled and which are relatively independent of rotor diameter. First, it is desirable to maintain a certain minimum circumferential spacing between functional bars or blades to permit a tumbling or reorientation of material, for efficient threshing and separating. Space must be provided, too, to allow concentrations of crop material, including ears of corn, to enter the separator and be conveyed into the threshing section. Secondly, there is a minimum length for the inclined blade, and particularly for the working edge, below which the material control and conveying potential of the inclined blade is not adequately realized.

It will be understood of course that the operation of the inclined blades of the present invention, discussed above, is achieved in cooperation with fixed housings and grates surrounding the rotor on which they are carried. The net result of the combined effects of the helical or helically arrayed members or helically disposed features of material control elements of rotor and housing, and friction and inertia of the crop material, and relative motion between the rotor and housing is to propel crop material rearwardly in a spiral path. In practice there is slippage of the crop material not only in relation to elements such as blades carried by the rotor but also in relation to fixed helical lead members (such as the helical infeed members 110, the transition helical members 112 and the spiral rods 116 of the grate), the latter also contributing to material agitation and aiding separation. The total slippage depends on a number of variables such as radial clearance between the rotor and housing, feed rate, etc. as well as the form of the material control elements themselves. The following rotor and inclined blade dimensions are examples only of some which have been tested with good results: length of threshing and separating sections of 900 to 1250 and 1250 to 1500 millimeters respectively; rotor outside diameters of 500 to 900 millimeters with peripheral speeds up to 45 meters/second and rotor to grate or housing clearance of 10 to 15 millimeters for small grains (higher clearances are desirable for corn); blade heights 40 to 110 millimeters and lengths up to 250 millimeters with axial spacing between blades of 100 to 200 millimeters; blades having angle of inclination from the radial (a) of 30° to 45° and a lead angle (b) of 15° to 30°; ratios of blade heights to both length and axial spacing about 1 to 2 gave good results. Circumferential intervals between functional elements (threshing bars, arrays of inclined blades, etc.) of the order of 100 to 200 millimeters or twice the length of the inclined blade are generally desirable. An example of a particular set of compatible specifications for a rotor having six conventional rasp bars 78 and six separator bars 84 with canted blades 86, for use in small grain such as wheat, is as follows: rotor diameter 700 millimeters; length of threshing section 1000 millimeters; length of separating section 1400 millimeters; rotor peripheral speed 30 meters/second; rotor to grate or housing clearance 15 millimeters; blade height, length and axial spacing 75, 150 and 150 millimeters respectively; and angles of inclination from the radial (a) and lead angle (b) both 30°.

It will be understood also that although clearance between rotor and housing or grate is varied according to crop type and condition, it must be limited so that rotor elements such as the inclined blades of the invention can maintain control of material and successful operation of the blades does not depend upon the presence of a housing or grate of a particular form, although they are particularly effective with relatively low friction housings with positive lead, similar to that of the present embodiment; and further, that the canted, tilt and raked blades 86, 72, 72a and 164 described above are only examples of possible configurations of the inclined blade.

The special function of the ramp-style rasp bars 64, seen best in FIGS. 2, 3, and 4, is to provide for incoming crop material, a smooth and gradual transition, from the predominantly conveying function of the infeed rotor portion 40 and the upstream portion of the transition section 42 of the rotor, to the threshing section of the rotor 44 and, in particular, to deliver crop material in suitable condition and disposition to the upstream end of the rasp bars 78 of the threshing section. As is apparent, towards the upstream end of the transition portion 42 of the rotor, the tilt blades 72 extend radially beyond the ramp-style rasp bar blades 70 and are dominant in controlling the crop material whereas towards the downstream end of the transition portion 42 of the rotor the ramp-style rasp bar blades 70 are closer spaced and, being mounted on the ramp or base 68, extend radially above the tilt blades 72 while the radial clearance between the blades and housing progressively decreases. The combined effect of the decreasing axial spacing between the ramp-style rasp bar blades 70 themselves and rearwardly decreasing tip clearance between the blades 70 and the transition housing 106 is that of a progressively reducing effective radial thickness of the annular space, which so controls the incoming crop material as to progressively attenuate it into a relatively thin mat, distributed around the circumference of the rotor ready for reception into the relatively thin annular space defined between the rasp threshing bars 78 and the threshing portion of the grate 114. As the tip clearances between blade and housing, and clearances between blades towards the rearward end of the ramp-style rasp bars 64 approach those of the rasp bars 78 of the threshing section, threshing begins in the rearward position of the transition section.

In the spike-tooth threshing arrangement of FIGS. 12 and 13, the tilt blades 72a replace the spike-teeth of a conventional spike-tooth cylinder. In addition to the material control and conveying functions of tilt blades described above, the tilt blades 72a here pass between the stationary spike teeth 142 causing a threshing action on crop material engaged thereby. Threshed grain passes through the grate or concave 138 to a cleaner (not shown) while MOG is conveyed spirally rearward to a separating section (not shown) downstream of the threshing section.

I claim:

1. In an axial flow rotary separator for processing crop material including a housing having walls including a foraminous portion, an inlet for receiving crop material and an outlet axially spaced downstream from the inlet, an improved rotor, mounted for rotation in the housing about an axis of rotation and disposed so as to create in cooperation with the housing an annular space extending axially between the inlet and the outlet, comprising:

a frame;

a plurality of material control blades carried by the frame, each blade being inclined away from a radial line passing through the blade and having a line of slope directed generally downstream and having a radially inwardly disposed inner edge and a radially outwardly disposed working edge, said working edge having, with respect to rotor rotation, a leading and a trailing portion and being disposed substantially athwart the direction of rotation with the leading portion upstream of the trailing portion, said blades being disposed to engage crop material delivered to the inlet and propel it in the annular space, cooperating with the housing to agitate and separate the material so that a first portion is expelled through the foraminous portion of the housing wall and said working edges urging the material downstream so that a second portion is discharged through the outlet.

2. The invention defined in claim 1 wherein the rotor includes a body surface and the inner edge of such blade is disposed adjacent the body surface.

3. The invention defined in claim 1 wherein the blades include at least one canted blade characterized in that the inner edge has, with respect to rotor rotation, a leading portion and a trailing portion and the leading portion is upstream of the trailing portion.

4. The invention defined in claim 1 wherein the blades include at least one canted blade characterized in that the line of slope is directed rotationally in advance of an axially downstream direction.

5. The invention defined in claim 4 wherein the inner edge is approximately parallel to the working edge.

6. The invention defined in claim 4 wherein the working edge is approximately perpendicular to a radial line extending from the rotor axis and passing through the working edge.

7. The invention defined in claim 4 wherein the working edge is approximately perpendicular to the line of slope.

8. The invention defined in claim 4 wherein the working edge of each canted blade is substantially parallel to the inner edge and the blade further includes a shin edge backwardly inclined with respect to the direction of rotation and extending between the leading portions of the inner and working edges respectively.

9. The invention defined in claim 1 wherein the blades include at least one tilt blade characterized in that the inner edge lies in a plane perpendicular to the rotor axis.

10. The invention defined in claim 1 wherein the blades include at least one tilt blade characterized in that the line of slope is directed in an axially downstream direction.

11. The invention defined in claim 10 wherein the leading portion of the working edge is disposed radially inward of the trailing portion.

12. The invention defined in claim 10 wherein each tilt blade is generally triangular in shape.

13. The invention defined in claim 1 wherein the blades include at least one raked blade characterized in that the inner edge has, with respect to rotor rotation, a leading portion and a trailing portion and the leading portion is downstream of the trailing portion.

14. The invention defined in claim 1 wherein the blades include at least one raked blade characterized in that the line of slope is directed rotationally behind an axially downstream direction.

15. The invention defined in claim 14 wherein the leading portion of the working edge is disposed radially inward of the trailing portion.

16. The invention defined in claim 14 wherein each raked blade is generally triangular in shape.

17. The invention defined in claim 14 wherein each raked blade includes a generally concave inner surface and an opposite outer surface generally parallel to the inner surface.

18. The invention defined in claim 1 wherein the plurality of blades includes at least one array of blades, said array having axially spaced upstream and downstream ends.

19. The invention defined in claim 18 wherein the blades are axially spaced and the array is generally axially extending.

20. The invention defined in claim 18 wherein the blades are axially spaced and the array extends generally helically with respect to the rotor axis.

21. The invention defined in claim 1 wherein the rotor includes an upstream threshing portion and a downstream separating portion, said threshing portion including at least some of the material control blades disposed in an array, said array having axially spaced upstream and downstream ends and the blades in said array being axially spaced, and further comprising at least one threshing bar carried by the frame, said threshing bar having axially spaced upstream and downstream ends and being circumferentially spaced from said array of blades.

22. The invention defined in claim 21 wherein at least one array of blades extends substantially the length of both the threshing and separating portions of the rotor.

23. The invention defined in claim 21 wherein at least one array of blades is generally axially extending.

24. The invention defined in claim 21 wherein at least one array of blades extends generally helically with respect to the rotor axis.

25. In an axial flow rotary separator for threshing and separating crops such as grain and the like, an improved threshing section comprising:

a housing having an inside wall and including a foraminous grate portion;

a plurality of axially spaced elongated crop engaging spike teeth carried by the housing and extending inwardly from the inside wall;

a rotor mounted for rotation within the housing;

a plurality of axially spaced outwardly extending crop engaging blades carried by the rotor, each blade having a slender body inclined away from the radial and having a line of slope extending generally in the axial direction of material flow, said body having an anterior leading edge disposed obliquely to the line of slope so that said edge extends backwardly in relation to rotation and outwardly and in the axial direction of material flow so that as the rotor rotates crop material engaged by the leading edge is urged axially in the direction of material flow and said blades extending in a radially overlapping relationship with the spike teeth and being disposed so that as the rotor rotates each blade passes adjacent a tooth and blades and teeth cooperate in causing a threshing action on the crop material engaged between the blades and teeth.

26. The invention defined in claim 25 wherein the line of slope of the blade body lies in a plane approximately parallel to the axis of the rotor.

27. The invention defined in claim 25 wherein at least a portion of the plurality of the blades are disposed in an array generally side-by-side.

28. The invention defined in claim 27 wherein the array is helically disposed in relation to the axis of the rotor.

29. The invention defined in claim 27 wherein the array is axially extending.

30. The invention defined in claim 25 wherein the teeth are inclined away from the axial direction of flow so that in relation to the rotor axis the angles of inclination of the longitudinal axis of each tooth and of the body of each blade are approximately equal.

31. The invention defined in claim 25 wherein at least some of the teeth are disposed so as to extend inwards from the grate portion of the housing.

32. The invention defined in claim 25 wherein the housing is approximately horizontally extending and has upper and lower portions and wherein the grate portion is included in the lower portion of the housing.

33. In an axial flow rotary separator in which a rotor rotates within a housing and cooperates with the housing to process crop material in an annular space between rotor and housing while conveying it from an upstream inlet towards a downstream outlet axially spaced from the inlet, a raised material control element carried by the rotor comprising:

an elongated body having an anterior working edge, said edge defining the radially outwardly and rotationally leading extremities of the body and said body including an anterior wall extending inwardly and backwardly in terms of rotor rotation from the working edge, said wall and edge defining a pocket radially inside of and rotationally behind the working edge, said working edge being disposed generally athwart the direction of rotation and having upstream and downstream ends, the upstream end being disposed rotationally in advance of the downstream end so that the working edge tends to lead downstream crop material engaged by it.

* * * * *